United States Patent
Brock

[11] Patent Number: 5,841,398
[45] Date of Patent: Nov. 24, 1998

[54] INTEGRATED NAVIGATION AND COMMUNICATION SATELLITE SYSTEM

[75] Inventor: J. Kurt Brock, Mountain View, Calif.

[73] Assignee: Space Systems/Loral, Inc., Palo Alto, Calif.

[21] Appl. No.: 753,111

[22] Filed: Nov. 20, 1996

[51] Int. Cl.$^6$ ............................................. G01S 5/02
[52] U.S. Cl. ................................. 342/357; 701/215
[58] Field of Search ........................ 342/357; 701/215

[56] References Cited

U.S. PATENT DOCUMENTS

| | | | |
|---|---|---|---|
| 5,345,245 | 9/1994 | Ishikawa et al. | 342/357 |
| 5,365,447 | 11/1994 | Dennis | 364/449 |
| 5,467,282 | 11/1995 | Dennis | 701/215 |
| 5,617,100 | 4/1997 | Akiyoshi et al. | 342/357 |
| 5,644,318 | 7/1997 | Janky et al. | 342/357 |
| 5,666,792 | 9/1997 | Mullins | 56/10.2 A |

FOREIGN PATENT DOCUMENTS 2 162013  1/1986  United Kingdom .

*Primary Examiner*—Joseph L. Felber
*Attorney, Agent, or Firm*—Perman & Green, LLP

[57] ABSTRACT

A system and method for improving the accuracy of pseudorange error measurements at a receiving or user station by utilizing a communications satellite as an additional ranging source for providing navigational signal information, wherein the user station, in fixing its position on the Earth, receives a pseudorange signal directly from a GPS satellite and also a pseudorange indicative or pseudorange-error indicative signal from a communications satellite which re-broadcasts, a time tagged, indicative signal to serve as another observable in pseudorange equations computed in the user station. The communications satellite may receive a pseudorange signal directly, or an error indicative signal from an Earth-based station, for conversion into the pseudorange indicative or error indicative signal it transmits. A particular embodiment for incorporation in a communications satellite constellation, such as Globalstar™, involves a reference station, or network of reference stations disposed at appropriate Earth locations, for providing pseudorange error signals from their locations that are collected at a masterstation in a satellite gateway for processing and then transmitting by the gateway to a communications satellite. The satellite converts and re-transmits the processed information to a user station at another Earth location where the received information is used, along with directly received GPS information signals, to enhance the navigational position accuracy of the user station. Thus, an additional ranging source is provided that improves the accuracy, availability, and integrity of the pseudorange measurements.

15 Claims, 2 Drawing Sheets

INTEGRATED NAVIGATION AND COMMUNICATION SATELLITE SYSTEM

BACKGROUND OF THE INVENTION

1. Field of the Invention

The present invention relates to Earth satellites which are used for navigation and those that are used for communications and, more particularly, to systems and techniques for integrating the signal information from navigation satellites and communications satellites to achieve highly accurate positioning and improved real time tracking and communication.

2. Prior Art

Presently there are a large number of rocket-launched Earth-orbiting satellites that are used in distinct combinations for providing signals relating either to aiding navigation or to facilitating communications. One example of a navigation aiding constellation of satellites is the U.S. government's Global Positioning System (GPS), NAVSTAR GPS, which provides radio navigational references, and an example of a communications constellation is the Globalstar™ system, owned by Globalstar L. P. of San Jose, Calif. many of the essential features of which are variously disclosed, for example, in U.S. Pat. Nos. 5,233,626 to S. A. AMES; 5,303,286 to R. A. WEIDEMAN; and 5,552,798 to F. J. DIETRICH ET AL, and which are incorporated herein by reference. For the most part, the various existing satellite constellations are limited to functioning in one or the other of the two categories, i.e., navigation or communications. It is common to both categories, to send appropriate signals from one or more orbiting satellites to one or more Earth-based receiving stations. A navigational receiving station may be in the form of a moving object, such as a satellite, ship, or plane, or it may be a stationary object, such as an Earth-based tracking, reference, or monitoring station. Moving communications stations may be in the form of cellular phones, while stationary receivers may be TV antennas or public telephone relay stations or control stations. In either event, the signals from the satellites provide information to the Earth-based receiving stations for appropriate processing in either a navigation or a communications system.

One example of the use of signals between satellites is the GPS Tensor™ system developed and owned by the present assignee Space Systems/Loral, Inc., of Palo Alto, Calif., for application in communications satellites, such as the Globalstar™ satellite system. The GPS Tensor™ system replaces conventional attitude and ground orbit position determination equipment by utilizing GPS signals and when joined with a reaction-momentum wheel and magnetic devices provides a spacecraft pointing and navigation system. It is a continuous tracking, L1, Coarse/Acquisition mode, code receiver, as explained in a paper presented at the ION GPS-94 Conference, Salt Lake City, Utah, Sept. 20–23, 1994, by J. K. BROCK (the present inventor), R. FULLER, S. HUR-DIAZ, and J. RODDEN, entitled, "GPS Attitude and Orbit Determination for Space", and incorporated herein by reference.

In a typical GPS system the precise position of each satellite at any given time is transmitted to the Earth in the form of a navigational signal containing information as to the position of the satellite in space with respect to GPS time, which information is called ephemeris data. Also, the signal includes an indication of the precise time at which the signal was transmitted. The range or distance between a satellite and a receiver may be determined using this time indication by noting the time that the signal is received by the receiver and calculating a propagation time delay from the time difference. The calculated time delay when multiplied by the speed of propagation of the signal provides a range or distance value, called a "pseudorange", between the transmitting satellite and the receiver. The distance is referred to as a "pseudorange" because, while the actual calculation may be accurate, errors may be introduced in the data by the fact, e.g., that the receiver clock may not be precisely synchronized with GPS time, and signal propagation through the atmosphere may encounter delays. Typically, GPS signals from at least two or three line-of-sight navigation satellites are needed to supply sufficient information to derive accurate position determinations at an Earth-based station. Conventionally four such satellites are used to determine each terrestrial position estimate, three for triangulation and one for correcting for clock bias. Consequently, satellite navigation systems and their augmentations to improve accuracy require a number of orbiting satellites to provide useful signal coverage over a wide region of the Earth.

As is understood in the art, to improve the accuracy of the position information in a given user receiver, the errors in the GPS signals from each navigation satellite, which errors comprise four major components, namely, clock, ephemeris, ionosphere delay, and troposphere delay, must be quantified and accommodated. This combination of error components from a plurality of satellites is utilized by a stationary, well surveyed, receiving station to determine the pseudorange error, i.e., signal propagation time delay error, with respect to the station location or position at a given time, due to different clocks in the satellites and at the station.

For a detailed description of a GPS system see, for example, the paper entitled, "NAVSTAR:Global Positioning System— Ten Years Later", *Proceedings of the IEEE*, Vol. 71, No. 10, October 1983, by BRADFORD W. PARKER and STEPHEN W. GILBERT, and the text entitled, "GPS: A Guide to the Next Utility", published by Trimble Navigation, Ltd., Sunnyvale, Calif., 1989, pp. 1–47, both of which are incorporated herein by reference.

Problem to be Solved

It will be seen, from a consideration of the present state of the art, that there is a need to provide more sources of useful navigational signals for reliable world-wide position determination without requiring the launching of more satellites.

Objects

It is therefore an object of the present invention to provide a method and means to enhance the availability of useful navigational signal information without the need for launching more navigational satellites.

It is another object of the invention to adapt existing satellite constellations to provide additional sources of navigational signal information to obviate the need for further navigational satellites.

It is further object of the invention to achieve high accuracy, world-wide navigational and communications coverage using a combined and integrated satellite-based navigation and communications system.

It is also an object of the present invention to use a communications satellite as an additional integrated navigation ranging source and communications medium for precise positioning and real time tracking.

SUMMARY OF THE INVENTION

The present invention is directed to improving the accuracy of pseudorange error measurements at a receiving or user station by utilizing a communications satellite as an additional ranging source for providing navigational signal information. In one particular embodiment, a user station, in attempting to fix its position on the Earth, receives a navigation reference signal, in the form of a GPS or pseudorange signal, directly from at least one navigation satellite and also a pseudorange indicative or pseudorange-error indicative signal from a communications satellite. The communications satellite receives direct GPS signals and re-broadcasts or processes and transmits, one or more time-tagged, pseudorange indicative or pseudorange-error indicative signals to said user station to serve as another observable in pseudorange equations computed in the user station to evaluate its position.

The communications satellite in this embodiment may be a Globalstar™ satellite and data from the aforementioned GPS Tensor™ system may be transmitted from the Globalstar™ satellite to the user station or terminal. Thus, an additional ranging source is provided that improves the accuracy, availability, and integrity of the pseudorange measurements without an additional navigation satellite.

A further embodiment is provided that may be utilized by incorporating it in a communications satellite system, such as the Globalstar™ constellation, that involves a reference station, or network of reference stations disposed throughout appropriate Earth locations, for receiving navigational information, such as GPS or pseudorange signals, at their respective locations. Each reference station preferably determines the errors in the received signals at its location and this navigational information is collected from each station and sent to a masterstation in a satellite gateway for processing out the error sources, i.e., clock, emphemeris, ionosphere delays, and troposphere delays. The processed signal is then transmitted by the gateway to a communications satellite. The communications satellite converts and re-transmits the processed information to a user station at another Earth or Earth-orbiting location where the received information is used, along with directly received navigational information signals, to enhance the navigational position accuracy of the user station information. A special interface card may be provided at the user station for formatting the additional navigational information for computation in the pseudorange equations.

Thus, communications satellites may be used to receive either direct pseudorange signals or processed pseudorange signal information, and to re-broadcast, one or more time-tagged, pseudorange indicative or pseudorange-error indicative signals to serve as further satellite sources of navigational information providing another observable in the pseudorange equations computed in the user station.

DETAILED DESCRIPTION OF THE PREFERRED EMBODIMENTS

The present invention embodies a method and means for improving the accuracy of pseudorange error measurements at a receiving or user station by utilizing a communications satellite as an additional ranging source for providing navigational signal information to the station. The station computes the pseudorange errors from the information using suitable pseudorange equations such as found in "Global Positioning System: Theory and Applications", Volumes I and II, Eds. B. W. PARKINSON and J. J. SPILKER, JR., of Volume 164, PROGRESS IN ASTRONAUTICS AND AERONAUTICS, Published by American Institute of Astronautics and Aeronautics, Inc., 1996, which is incorporated herein by reference.

Figure 1:
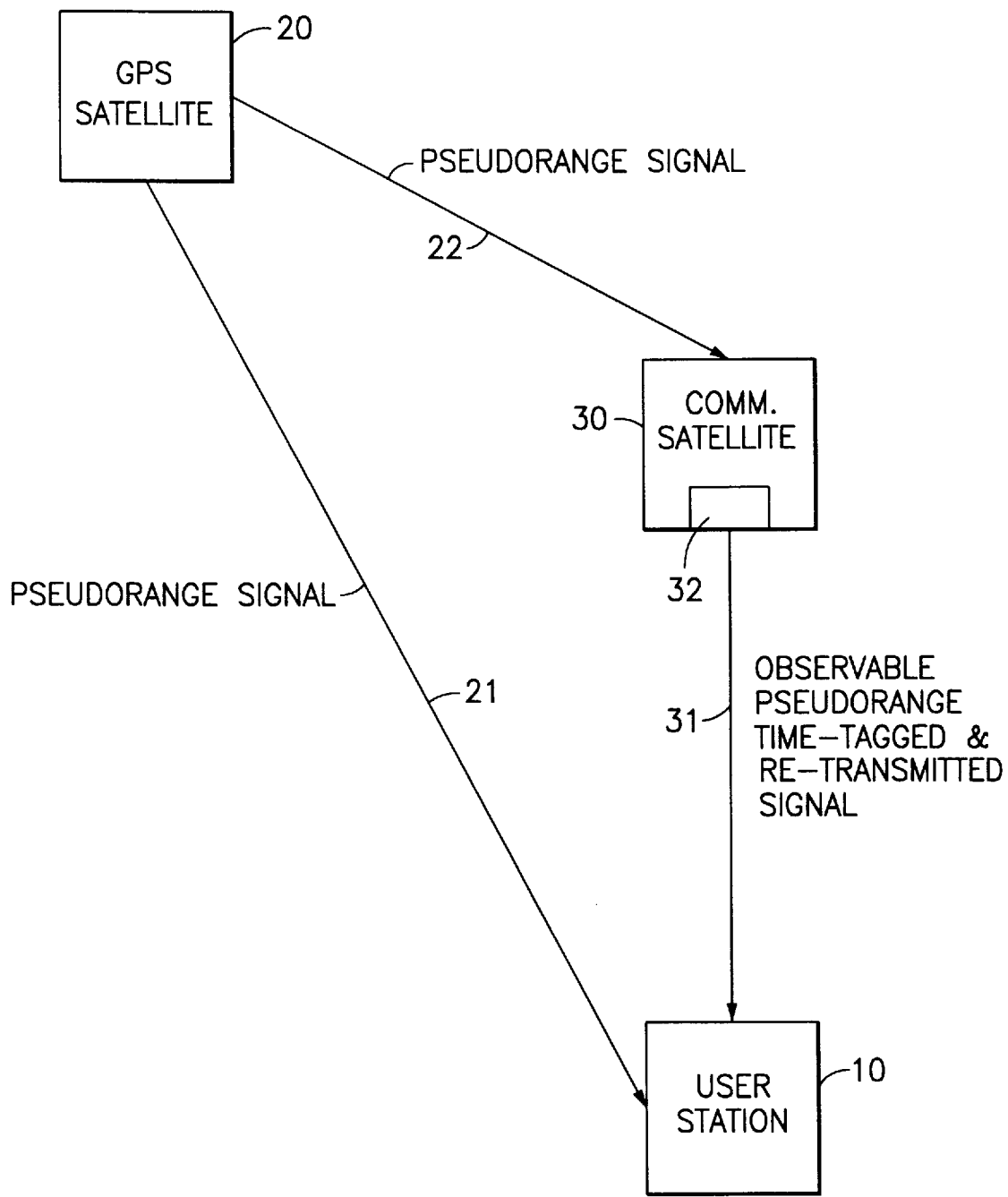
FIG. 1 illustrates one embodiment of an integrated navigation and communication satellite system in accordance with the invention involving the use of an orbiting communications satellite for picking up navigational satellite information, in the form of GPS or pseudorange navigational signals, broadcast by a navigation satellite and re-transmitting them, optionally after processing, with a time-tag, to an Earth-based user station, which also receives the navigational satellite information signals directly from the navigation satellite, for use in position determination.

In one particular embodiment, such as shown in FIG. 1, a user station 10, e.g., located on the Earth, receives a GPS or pseudorange signal 21 broadcast directly from a navigational satellite 20 and also a "converted" pseudorange signal 31 that is transmitted from a communications satellite 30 which has also received a direct pseudorange signal 22 from satellite 20. Signal 31 may be processed or "converted" by merely re-broadcasting a time-tagged version of pseudorange signal 22, with possibly a frequency or bandwidth shift, or by correcting it for pseudorange error before re-transmission, or by other suitable processing to incorporate further position information, such that a pseudorange or position indicative signal 31 is transmitted that serves as another accuracy observable in the pseudorange equations computed in the user station 10.

The navigational satellite 20 may typically be one or more GPS signal broadcasters and the communications satellite 30 may be a Globalstar™ satellite with the aforementioned GSP Tensor™ system 32 from which suitable navigational data may be transmitted from the Globalstar™ satellite to the user station or terminal 10. Thus, an additional ranging source is provided, through the use of an existing communications satellite, that improves the accuracy, availability, and integrity of the pseudorange measurements and with the addition of the communications capability enables and facilitates real time asset tracking.

Figure 2:
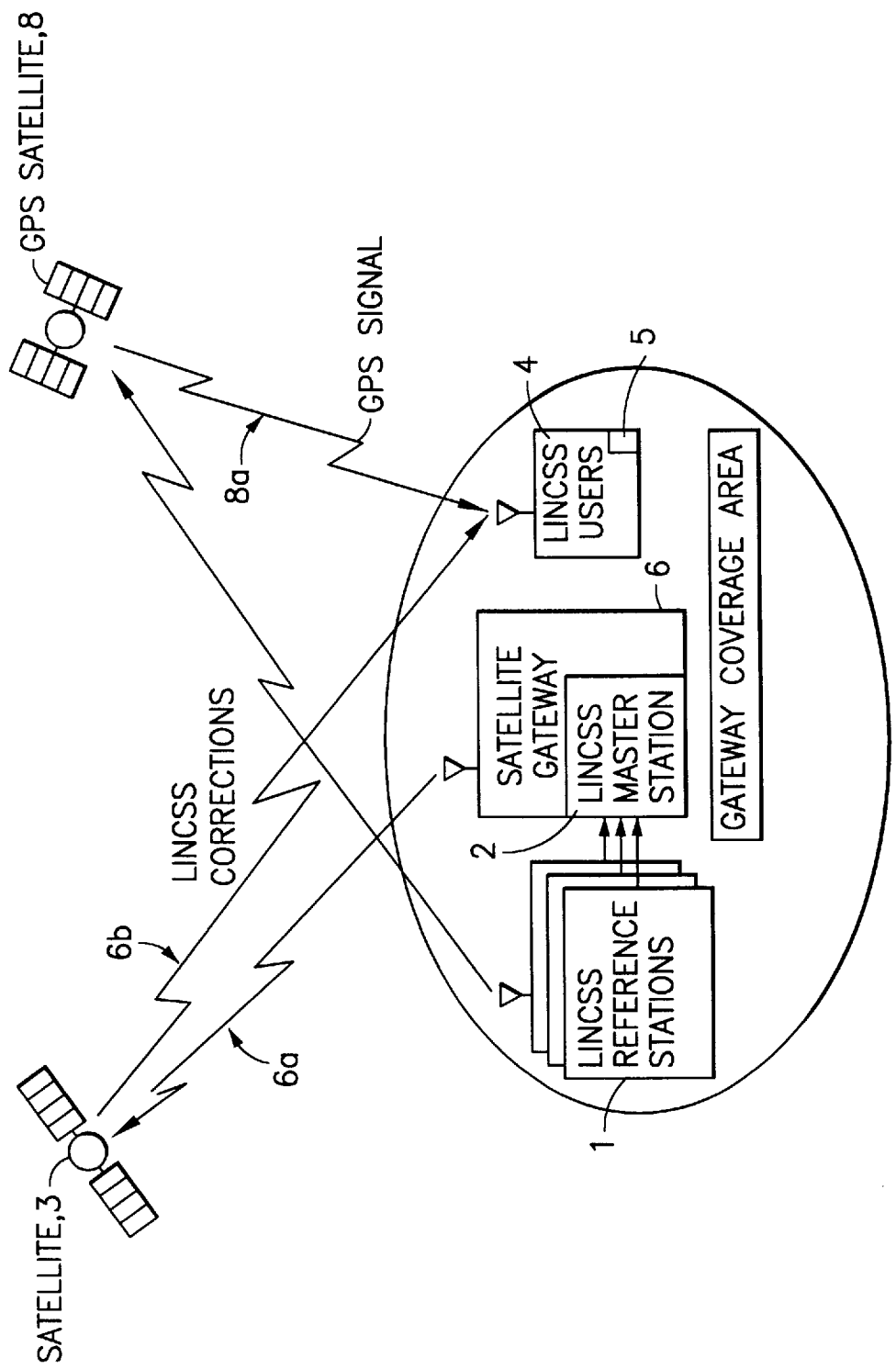
FIG. 2 illustrates another embodiment of an integrated navigation and communication satellite system in accordance with the invention wherein one or more Earth-based reference stations collect navigational satellite information and process it or provide it to a master station which processes it into error information for transmission to a communications satellite that retransmits it to an Earth-based user station for comparison with directly transmitted navigational satellite information to determine the station's location.

A further embodiment for incorporation in a communications satellite system, such as the Globalstar™ constellation, is shown in FIG. 2. The Globalstar™ system generally comprises a number, presently forty-eight, of communications satellites that exchange transmitted communications between mostly movable terminals or user stations and a number of essentially fixed Earth-based reference stations with antennas (see U.S. Pat. No. 5,552, 798). As seen in FIG. 2, for communications purposes a satellite gateway station 6 transmits a communications signal 6a to a Globalstar™ satellite 3 which essentially acts as a "bent pipe" in forwarding the signal 6b, which may be bandwidth shifted, to a user station 4.

To adapt this basic communications system for incorporation into an integrated navigation and communications satellite system in accordance with the invention, a reference station 1, or typically a network of reference stations, is provided at suitable fixed locations, with respect to a respective gateway station 6, for collecting navigational information broadcast by a navigational satellite, e.g., GPS satellite 8. Each reference station 1 has precise information as to its own location, which information may be used with the satellite observables to calculate error information at the station. The position or error information is collected and fed from the reference stations 1 to a masterstation 2 for processing. The masterstation 2 is preferably located at or near the gateway station 6 and provides the processed navigational information to the gateway station 6 for transmittal to the Globalstar™ satellite 3. Satellite 3 may process or "convert" the received information and re-transmit or forward a signal indicative thereof. With this arrangement, a user station 4, which may be one of many in the region from which signals from the GPS satellite 8 and Globalstar™ satellite 3 are accessible, can pick up the GPS signal 8a directly from the GPS satellite 8 and the forwarded signal 6b, containing the processed error information transmitted by the gateway station 6, from the Globalstar™ satellite 3. The user station 4 utilizes the received information from the two sources to correct for pseudorange error and augment the accuracy of its navigational position determination. A special interface card 5 may be provided at the user station 4 for formatting the received navigational information to facilitate the appropriate calculations in connection with the error components in the pseudorange equations to provide the position and time information or information error.

As a Globalstar™ gateway station, such as station 6, typically contains a GPS processing capability, if a high level of accuracy is not absolutely necessary, the reference stations 1 may be dispensed with and the gateway station 6 used as a reference station. Also, although one GPS satellite has been shown in the Figures for simplicity of description, it will be understood that signals from a plurality of such navigational satellites are normally needed for achieving reasonably accurate positioning information. On the other hand, one or more communications satellites may be adequate in implementing the invention. Communications satellites in low Earth orbits (LEO) are preferred to minimize latency of transmission.

It will be appreciated that the systems of the embodiments of the invention lend themselves to alternative processing of the navigational reference signals in various components, such that, e.g., the communications satellite may be used to re-broadcast either pseudorange, or pseudorange indicative, or pseudorange error signals depending on what processing is most conveniently carried out in the other related components or stations of the system.

Among the many contemplated applications of the present integrated navigational and communications system is its use in air traffic control systems where precise, real-time, tracking information on multiple aircraft is required. In particular, systems performing Automatic Dependent Surveillance (ADS), thus far supported, at least in part, by terrestrial infrastructure, should now be implementable in an entirely space-based architecture. The invention may also have application in Intelligent Transportation Systems, maritime harbor entry control systems, automated port facilities for container positioning and control, as well as various other tracking operations requiring precise positioning and real-time communications such as the tracking of prisoners, parolees, and other people.

What is claimed is:

1. A satellite system for integrating navigation and communications information, comprising:
    navigational satellite means for providing navigational reference signals;
    communications satellite means for receiving transmitted communications signals and re-transmitting communications signals indicative thereof;
    transmitting means, in said communications satellite means, for transmitting signals indicative of said navigational reference signals; and receiver station means for receiving communications signals re-transmitted from said communications satellite means, and comprising:
        means, receiving navigational reference signals directly from said navigational satellite means and said indicative navigational reference signals from said transmitting means in said communications satellite means, for performing calculations using both of said reference signals to provide enhanced position and time information for said receiver station means; and
    wherein said transmitting means comprises:
        means for receiving navigational reference signals directly from said navigational satellite means; and
        means for converting said navigational reference signals to indicative navigational reference signals for transmitting to said receiver station means.

2. A system as in claim 1, further comprising:
    antenna means for transmitting navigational error indicative signals to said communications satellite means;
    at least one reference station for receiving navigational reference signals directly from said navigational satellite means, and using said navigational reference signals to provide pseudorange error signals to said antenna means for transmitting as said navigational error indicative signals; and
    wherein said transmitting means further comprises:
        means for receiving said navigational error indicative signals from said antenna means; and
        means for converting said navigational error indicative signals to indicative navigational reference signals for transmitting to said receiver station means.

3. A system as in claim 1 further comprising:
    Earth-based station means for transmitting navigational error indicative signals to said communications satellite means;
    processing means for providing said navigational error indicative signals to said Earth-based station means;
    a plurality of Earth-fixed reference stations for receiving navigational reference signals directly from said navigational satellite means, each of said reference stations comprising:
        means for using said navigational reference signals to provide pseudorange error signals; and
        means for transmitting said pseudorange error signals to said processing means for collection and conversion to navigational error indicative signals provided to said Earth-based station means for transmitting to said communication satellite means; and
    wherein said transmitting means further comprises:
        means for receiving said navigational error indicative signals from said Earth-based station means; and
        means for converting said navigational error indicative signals to indicative navigational reference signals for transmitting to said receiver station means.

4. A system as in claim 3 wherein said processing means comprises a master station and said Earth-based station means comprises a satellite gateway antenna.

5. A system as in claim 1 wherein said indicative navigational reference signals comprise pseudorange signals and said means for performing calculations comprises means for using said pseudorange signals in pseudorange equations to evaluate position and time for said receiver station means.

6. A system as in claim 1 wherein said indicative navigational reference signals comprise pseudorange error signals and said means for performing calculations comprises means for using said pseudorange error signals in pseudorange equations to evaluate position and time for said receiver station means.

7. A system as in claim 1 wherein said navigational satellite means comprises a plurality of GPS satellites and said communications satellite means comprises an LEO satellite.

8. A system as in claim 1 wherein said means for performing calculations comprises interface card means for formatting said indicative navigational reference signals for use in performing said calculations to provide enhanced position and time information for said receiver station means.

9. A method for integrating satellite navigation and communications information, comprising the steps of:

locating at least one navigational satellite that produces navigational reference signals;

locating at least one communications satellite that receives transmitted communications signals and re-transmits signals indicative thereof;

relaying, from said communications satellite, signals indicative of said navigational reference signals;

receiving at a receiver station, that receives indicative communications signals from said communications satellite, navigational reference signals directly from said navigational satellite and said indicative navigational reference signals relayed from said communications satellite; and performing appropriate calculations using both of said reference signals to provide enhanced position and time information for said receiver station; and wherein said relaying step comprises:

receiving navigational reference signals at said communications satellite directly from said navigational satellite; and converting said navigational reference signals to said indicative navigational reference signals for transmitting to said receiver station.

10. The method of claim 9 wherein said navigational reference signals are pseudorange signals and said step of performing appropriate calculations comprises evaluating pseudorange equations.

11. The method of claim 9 wherein said relaying step further comprises:

receiving navigational reference signals in the form of pseudorange signals at said communications satellite directly from said navigational satellite; and processing said pseudorange signals into pseudorange error signals and converting said pseudorange error signals to said indicative navigational reference signals for transmitting to said receiver station.

12. The method of claim 9, comprising the further steps of:

receiving navigational reference signals directly from said navigational satellite means at an Earth-based reference station and using said navigational reference signals to produce pseudorange error signals;

processing said pseudorange error signals into navigational error indicative signals;

transmitting said navigational error indicative signals to said communications satellite; and receiving said navigational error indicative signals in said communications satellite and converting said navigational error indicative signals to indicative navigational reference signals for relaying to said receiver station.

13. The method of claim 9 comprising the further steps of:

disposing a plurality of Earth-fixed reference stations for receiving navigational reference signals directly from said navigational satellite and using said navigational reference signals to provide respective pseudorange error signals;

collecting said pseudorange error signals and converting them to navigational error indicative signals;

transmitting said navigational error indicative signals to said communications satellite; and receiving said navigational error indicative signals in the communications satellite and converting said navigational error indicative signals to indicative navigational reference signals for relaying to said receiver station.

14. The method of claim 9 wherein said indicative navigational reference signals comprise pseudorange signals and said step of performing appropriate calculations comprises using said pseudorange signals in pseudorange equations to evaluate position and time for said receiver station.

15. The method of claim 9 wherein said indicative navigational reference signals comprise pseudorange error signals and said step of performing appropriate calculations comprises using said pseudorange error signals in pseudorange equations to evaluate position and time for said receiver station.

* * * * *